(No Model.)

A. L. CUSHMAN.
CORE AND COIL FOR DYNAMO ELECTRIC MACHINES.

No. 555,850. Patented Mar. 3, 1896.

Witnesses
F. S. Berry
R. Burroughs

Inventor
Abr L. Cushman
By his Attorney J. B. Thurston

UNITED STATES PATENT OFFICE.

ABE L. CUSHMAN, OF CONCORD, NEW HAMPSHIRE, ASSIGNOR OF ONE-HALF TO BENJAMIN A. KIMBALL, OF SAME PLACE.

CORE AND COIL FOR DYNAMO-ELECTRIC MACHINES.

SPECIFICATION forming part of Letters Patent No. 555,850, dated March 3, 1896.

Application filed August 29, 1894. Renewed August 28, 1895. Serial No. 560,826. (No model.)

*To all whom it may concern:*

Be it known that I, ABE L. CUSHMAN, a citizen of the United States, residing at Concord, in the county of Merrimac and State of New Hampshire, have invented certain new and useful Improvements in Cores and Coils for Dynamo-Electric Machines; and I do hereby declare the following to be a full, clear, and exact description of the invention, such as will enable others skilled in the art to which it appertains to make and use the same.

Dynamo-electric machines, to which my invention relates, are provided with energizing-coils, which are variously placed in the inductive member of such machines, according to the methods devised by various inventors. The inductive member usually consists of layers of laminæ, between which are placed thin sheets of insulating material, and the edges of such laminated core are grooved so as to form recesses for the reception of the coils or windings. It is to this feature of the construction of dynamo-electric machines that my present invention more particularly applies, as a practical method whereby the coils may be retained in the recesses is a very important factor in the construction of such machines, and it is also important that the coils to be thus applied should be wound separately and then placed in the laminated core, rather than to wind them directly upon the core, and the difficulty has been to fill the recesses with the coils in a manner that will insure their retention therein. For the purpose of retaining the coils in the recesses the latter have usually been formed with flaring sides, or undercut—*i. e.*, gradually widening toward their bottom; but as the coil must necessarily enter in such case through the narrowest part of the groove or recess the coil cannot be a very snug fit.

The object of my invention is to improve the form of the grooves or recesses in the core so they may be readily filled by the coils, and to provide simple and practical means for retaining the latter in place; and a further object of my invention is the coils themselves, which are as nearly as possible uniform in length, whereby the inductive influences are substantially equal throughout the entire core.

My invention will be fully set forth and described in the following specification and claims, and clearly illustrated in the accompanying drawings, forming a part thereof, of which—

Figure 2:
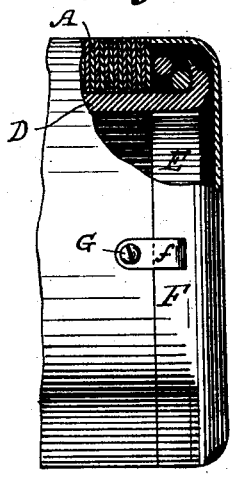
Figure 1:
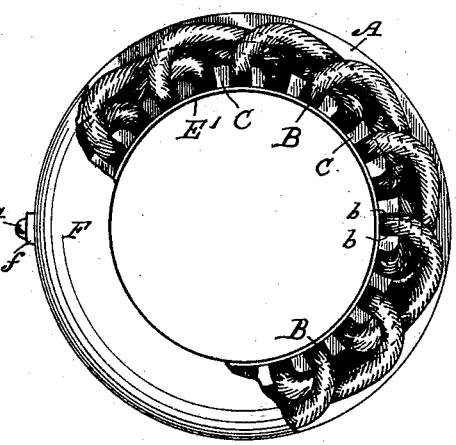
Figure 3:
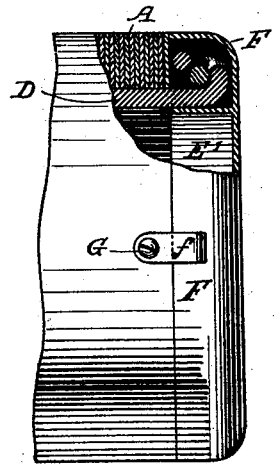

Figure 1 is an end elevation of a field-magnet for a dynamo-electric machine, showing my improved form of grooves or recesses for the coils, a few coils in their respective positions, and one form of my improved coil-retaining device. Fig. 2 is a broken side elevation of one end of a field-magnet, showing my improved coil-retaining device. Fig. 3 is a similar view showing a modification of my coil-retaining device, Figs. 4, 5, and 6 being details.

Similar letters of reference denote corresponding parts throughout the several views.

Figures 4, 5, 6:
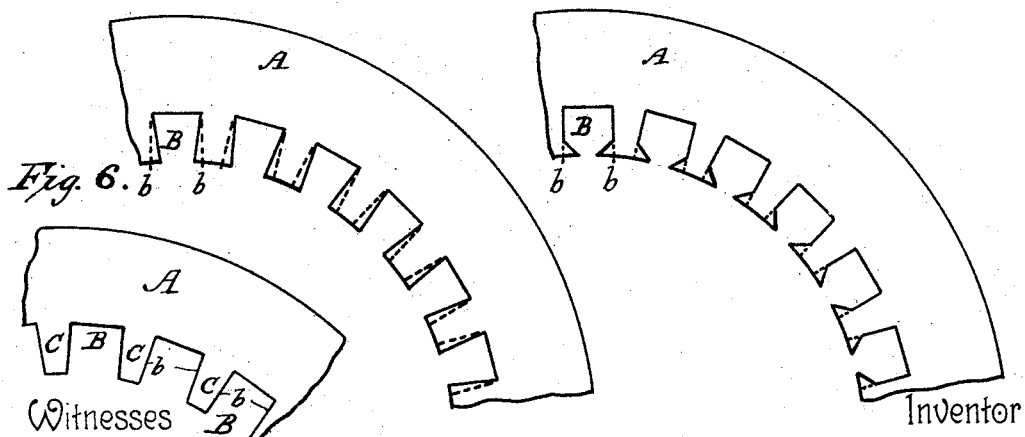

A represents the laminated core. B are the grooves or recesses formed therein to receive the energizing-coils D, and C represents those portions of the core lying between the recesses and usually called "teeth." As now or heretofore constructed, these so-called "toothed" or "notched" cores are deprived of their maximum efficiency by reason of the form adopted for the recesses, which necessarily requires that the width of the teeth shall not fall short of that which is sufficient for strength, since a wide tooth means greater space between the energizing-coils, and hence larger breaks in the magnetic circuit. This I illustrate in Figs. 4, 5, and 6. For example, Fig. 4 shows one form of under-cut recess commonly used in such cores, and Fig. 5 shows another, and in each I have shown by dotted lines my improved form of recess in comparison, in order to illustrate how, by means of my improved method for supporting or retaining the coils, I am enabled to reduce the width of the teeth at that point where such a reduction is most desirable and where width is most objectionable—viz., at their face—by which construction I reduce the breaks in the magnetic circuit to their minimum.

The coils D are made up of a number of small insulated wires, which closely fill the recesses B of the core A, and these I have found, in order that they may be most effective and equal in magnetic strength one with the other, should be as nearly as possible equal in length one with the other, which, together with my improved form of recesses and narrow-faced teeth of the core, produce a field which is as nearly as possible mutual throughout, and also of high magnetic efficiency.

The recesses B have parallel sides b, and in order to keep the coils D in place I employ a retaining-ring E, which, being a snug fit for the said coils, may be cemented or otherwise secured to their projecting ends, or said retaining-ring may form part of either end cap F, as seen at E' in Fig. 3, said cap being secured to the outer shell or core by means of ears f, through which are passed screws G, as shown in Figs. 2 and 3.

Having described my improvements, what I claim is—

1. In dynamo-electric machines, an inductive core provided with grooves or recesses of equal width from top to bottom, coils or windings composed of insulated wire all of equal length, and suitable end caps for inclosing the coils or windings, each having an internally-projecting flange or ring adapted to support said coils.

2. In dynamo-electric machines, an inductive core provided with grooves or recesses having straight parallel sides, teeth formed by the said recesses, having tapering sides and narrower at their face than their base, coils or windings all of equal length and adapted to fill said recesses, and suitable end caps for inclosing the coils or windings, each being provided with an internally-projecting flange or ring for supporting the said coils.

3. An inductive core provided with recesses having straight parallel sides, tapering divisions or teeth the faces of which are narrower than their base, coils or windings all of equal length and adapted to fill said recesses, and retaining-rings for supporting said coils, all so arranged as to produce a field as nearly as possible mutual throughout and of high magnetic efficiency.

In testimony whereof I affix my signature in presence of two witnesses.

ABE L. CUSHMAN.

Witnesses:
J. B. THURSTON,
CARRIE E. EVANS.